Nov. 3, 1959     C. WARRICK     2,911,163
SPOOLS FOR PHOTOGRAPHIC FILM AND THE LIKE
Filed Jan. 18, 1957
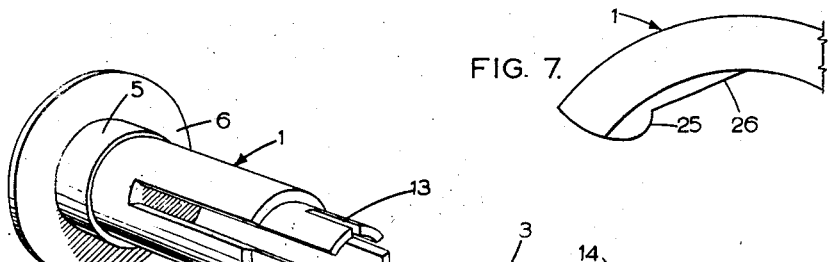
FIG. 7.
FIG. 1.
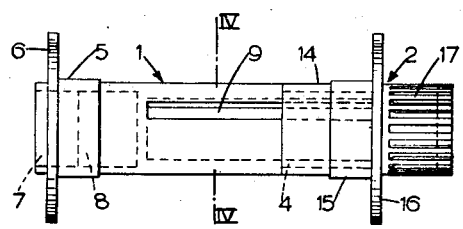
FIG. 2.
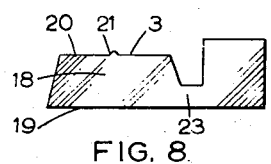
FIG. 8.
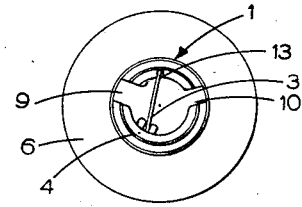
FIG. 3.
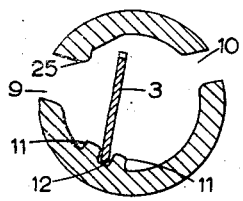
FIG. 4.
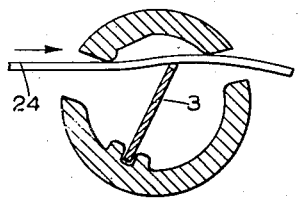
FIG. 5.
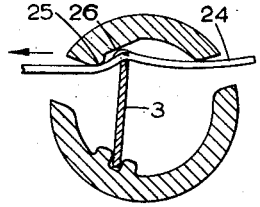
FIG. 6.
COLIN WARRICK
INVENTOR.
by Richardson, David and London
ATTORNEYS.

United States Patent Office 2,911,163
Patented Nov. 3, 1959

2,911,163

SPOOLS FOR PHOTOGRAPHIC FILM AND THE LIKE

Colin Warrick, Chigwell Row, England

Application January 18, 1957, Serial No. 634,911

Claims priority, application Great Britain January 24, 1956

4 Claims. (Cl. 242—74)

This invention concerns improvements in or relating to spools for photographic film and the like. More particularly but not exclusively it refers to the spools of cassettes used in 35 mm. cameras.

As will be well known, 35 mm. cameras are becoming increasily popular in this country on account of their ease of handling and the general cheapness of photography in this size and it has been observed that a large proportion of the people who use such cameras re-load their own cassettes with cut lengths of 35 mm. films. However, since 35 mm. film is not protected by backing paper, the operation of loading the cassettes must be carried out in absolute darkness because the film is sensitive to very weak light. Moreover the normal 36 exposure length of film is approximately five feet long and it will be appreciated that handling this length of film in absolute darkness can be an extremely difficult task. In loading a cassette, the length of film is wound upon a spool which is then inserted into a light-tight outer casing (which forms the cassette proper) whilst the end of the film protrudes through a light-tight slot in the cassette. It is essential that the end of the film should be securely anchored to the spool so that there is no danger that the film may become separated from the spool for this would prevent rewinding when the whole film has been exposed. On the other hand, it is a conflicting requirement that the end of the film should be readily attached to the spool for, as has been explained, this has to be done in darkness.

Many previous proposals have been made for constructing the spool with various forms of anchorage member for attaching the film thereto, but no construction has been proposed which is completely satisfactory when the spool is made of a plastic material due to manufacturing difficulties, and it will be appreciated that a plastic material is preferred for the sake of economy. It is, therefore, a first object of the present invention to provide an improved form of spool.

It is a further object of this invention to provide a spool for photographic film and the like comprising a body on which the film is to be wound and having a slot extending therethrough for the reception of the film end, a tongue resiliently mounted within said body in such a manner that when the film is inserted in the slot the free edge of the tongue causes the portion of film within the spool body to be bowed, and abutment means located within said body in such a position as to prevent, by engagement with the free edge of the tongue with the inter-position of the film, the withdrawal of the film.

It is yet another object of this invention to provide a spool for photographic film and the like comprising a cylindrical body on which the film is adapted to be wound and having a slot extending therethrough for the reception of the end of the film, and a tongue resiliently mounted chord-wise within said body in such manner that insertion of the film causes movement of said tongue towards the diametrical position whereas attempted withdrawal of the film causes the film to move the tongue away from the diametrical position thereby to cause trapping of the film.

For ease in manufacture the spool body itself is preferably made as a moulding of thermo-plastic material in two parts, namely a spindle and an end cap. When these two parts are assembled together the spool body is desirably of the shape prescribed by the internationally agreed regulations so as to fit the majority of cameras and, as is customary, is provided with two side cheeks for locating the edge of the film as it is being wound thereon, one end of the spool body being provided with a transverse bar for engagement with the re-wind spindle and the other end with a bearing part extending outwardly beyond the cheek at that end.

It is now conventional that the end of the film to be wound on to the spool should be provided with a tab of reduced width and, therefore, the transverse slot in the spool body which is designed for the reception of this tab does not need to extend the whole distance between the two side checks thereof. Obviously, however, the precise dimensions of this slot may be as desired.

The free edge of the tongue within the spool body is desirably serrated, notched or otherwise roughened at the part adapted to engage with the film, thereby to increase the hold of the tongue on the film.

Further features of the invention will become apparent from the following description and the claims.

In order that this invention may more readily be understood one embodiment of the same will now be described with reference to the accompanying drawings, in which;

Figure 1 is an exploded perspective view of the spool;

Figure 2 is an elevation of the spool;

Figure 3 is a plan view of the spool body with a cap removed;

Figures 4, 5 and 6 are outline sections on the line IV—IV of Figure 2 showing various positions of a tongue;

Figure 7 is an enlarged detail plan view corresponding to Figure 3; and

Figure 8 is an elevation of the tongue.

As can be clearly seen from Figure 1 the spool of this invention comprises three main parts, namely a spindle 1, a cap 2 and a tongue 3 housed within the spindle.

As can be seen from Figures 1 to 6, the spindle 1 is of generally cylindrical form for the major part of its length, but is of reduced diameter at one end 4 to receive the cap 2 and of slightly increased diameter at its other end 5 whereby the film will only be in contact with the material of the spindle at its perforated edges, thereby to reduce the degree of contact between the emulsion of the film and the material of the spindle. At its end 5 the spindle is provided with a side cheek 6 which is spaced slightly inwardly from the end of the spindle (see Figure 2) and this end of the spindle is counterbored at 7 and is provided with a transverse bar 8 for the reception of the re-wind spindle of a camera, this being in accordance with the internationally agreed standards.

The main part of the spindle 1 is hollow and its perimetrical wall is provided with a pair of longitudinal slots 9 and 10. The slot 9 is slightly wider than the slot 10 and is arranged generally radially of the spindle 1 whereas the slot 10 is arranged at an angle to the radius passing therethrough. As can be clearly seen from the drawings, these two slots define between them a slot or aperture extending along a first chord through the spindle for the reception of the end of the film which enters through the slot 9 and leaves through the slot 10, the film extending chord-wise through the spindle 1 and the inner corners of the slots being rounded to prevent damage to the film. As can be seen from Figure 1 of the drawings, these slots 9 and 10 extend to the end 4 of the spindle 1 but are closed by the cap 2 so that in effect they extend only over the central portion of the spool (see Figure 2). A pair of ribs 11 also extend down the inner surface of the perimetrical wall of the spindle 1 and define between them a channel or groove 12 for the reception of the rear edge of the tongue 3. The perimetrical wall of the spindle 1 is also provided with a further radial slot 13 which with the channel 12 defines a further chord of the spindle, the angle between this chord and the chord formed between the slots 9 and 10 being acute on the side adjacent the slot 9. As can be seen from Figures 1 and 2, the slot 13 is located in the end part 4 and is closed by the end portion of the cap 2.

As can be seen from Figures 1 and 2, the cap 2 is provided with a sleeve portion 14 adapted to fit over the reduced end portion 4 of the spindle in order to provide the necessary substantially flush surface between the two ends of the spool and the cap 2 is also provided with a part 15 of increased diameter corresponding to the part 5. The cap 2 is provided with the second side cheek 16. Outwardly of the side cheek 16, the cap 2 is provided with a serrated hollow boss 17 of usual form. The cap 2 is provided internally with an annular rib (not shown) adapted to fit within the end 4 of the spindle 1 in order to make a rigid structure and these two parts are normally secured together by means of an adhesive.

The blade 3 is illustrated in Figure 8 and as can be seen comprises two main parts. The part 18 is of generally truncated triangular form and the longer edge 19 thereof is normally engaged in the channel 12 in the body of the spindle, the opposite edge 20 being free. As can be seen, the edge 20 is provided approximately at the mid point of its length with a small pip or projection 21 or alternatively this edge of the blade is roughened or serrated for a purpose which will hereinafter be apparent.

The other part of the tongue is of slightly greater height than the part 18 and is joined thereto by means of the integral web 23 which, since the tongue is made of a resilient material such as phosphor bronze, means that when the edge 19 is located in the channel 12 and the opposite edge of the second part in the slot 13, the free edge 20 can flex resiliently with respect thereto.

Figure 4 is an outline section on the line IV—IV of Figure 2 and shows the tongue 3 in its normal position lying along the chord joining the channel 12 to the slot 13. When, as illustrated in Figure 5, the tab 24 of a piece of film is inserted through the slot 9 into the spindle 1 and is passed out through the slot 10, frictional engagement between the film and the free edge of the tongue 3 causes the latter to flex about the part 23 to lie along the diameter passing through the channel 12 thereby to increase the effective spacing between the free edge 20 of the tongue and the film and thereby to permit its easy insertion into the spool. When, on the other hand and as illustrated in Figure 6, tension is applied to the film (for example in an attempt to withdraw it from the spool), the film frictionally engages the free edge of the tongue and in particular the nib 21 and causes the tongue to flex about the part 23 in the opposite direction. Since the tongue is arranged chord-wise within the spindle this causes its free edge to come into engagement (through the intermediary of the film) with the interior of the spindle 1 whereby the film is securely held in place and, in order to assist this engagement and render it more secure, the interior surface of the spindle is provided with a longitudinal rib 25 adjacent to the inner edge of the slot 9 as can be clearly seen in the drawings. Moreover, see particularly Figure 7, the rib 25 merges into a cam surface 26 so that the initial movement of the tongue causes a progressively increasing gripping effect on the film which reaches a maximum when the nib 21 engages the rib 25.

It will now be apparent that the tongue 3 is completely free to move within the spindle 1 and is not moulded therein during the course of manufacture. This is a very important feature for the efficiency of operation of the spool will thus not depend upon the rather difficult task of positioning the tongue in the correct place during the moulding operation. It will be apparent that the tongue is positioned by a portion located in the channel 12 and slot 13 so that the edge 20 thereof is free to flex as indicated in Figures 4 to 6 of the drawings.

I claim:

1. A spool for photographic film comprising a hollow substantially cylindrical body on which the film is to be wound, a longitudinal slot extending transversely through the body for the reception of the end of the film, a longitudinal groove on the inner surface of the body, a resilient tongue having one edge located in said groove and a remote edge positioned to intersect the path of a film extending through said longitudinal slot, a further slot in said body located opposite to said groove, and a part on said tongue located in said further slot, such further slot being so positioned that the part of said tongue located therein does not obstruct said longitudinal slot and whereby said tongue is located substantially along a chord of the cylinder intersecting the chord formed by the film when located in the first said slot.

2. A spool for photographic film comprising a hollow substantially cylindrical body to support the film, first and second longitudinal slots in said body positioned to act as entrance and exit slots for the film end, a third longitudinal slot in said body, a longitudinal groove on the inner surface of the body, a resilient metal tongue in the form of first and second parts wherein the first part is of dimensions to permit its opposite edges to be located in said groove and third slot respectively, said third slot being so located that said first tongue part does not obstruct passage of the film through said first and second slots, whereas said second part is of such dimensions that when one edge thereof is located in the said groove the opposite edge thereof lies, with respect to said groove, on the remote side of a line joining said first and second slots, and a relatively narrow part joining said first and second tongue parts to permit the second tongue part to flex relatively to the first tongue part.

3. The spool of claim 2 in which the inner surface of the spool body is, on the side of the first said slot remote from the said groove, formed as a cam surface positioned to engage the free edge of the second tongue part when the same is flexed relatively to the first tongue part.

4. A spool for photographic film comprising a first body part in the form of a hollow generally cylindrical member, a film locating side cheek positioned adjacent to a first end of such first body part, first and second slots extending longitudinally of said first body part from the second end thereof to adjacent to said side cheek, said slots defining a first chord of the body part and being positioned to act as film entrance and exit slots, a longitudinal groove on the inner surface of the first body part extending from the second end thereof and located in the major sector defined by said first chord and a third longitudinal slot in said first body part extending a short distance from the second end of such body part and being located in the minor sector to define with said groove a second chord; a flat metal tongue formed by first and second parts and a narrow portion joining said first and second parts, the dimensions of said first part being such that the edges thereof may be located in said groove and third slot whereby said second tongue part, having one edge thereof located in said groove, lies along said second chord and intersects said first chord; and a second body part in the form of an end cap, a tubular portion on said second body part dimensioned to fit over the second end of said first body part to cover said third slot and the ends of said first and second slots, and a film locating side cheek on said second body part.

References Cited in the file of this patent
UNITED STATES PATENTS

| | | |
|---|---|---|
| 1,175,916 | Anderson | Mar. 21, 1916 |
| 2,766,948 | Mundt et al. | Oct. 16, 1956 |

FOREIGN PATENTS

| | | |
|---|---|---|
| 476,201 | Germany | Apr. 25, 1929 |